June 11, 1946.   E. T. HOLDER   2,402,046
VEHICLE FOR CHILDREN
Filed March 23, 1944   4 Sheets-Sheet 1
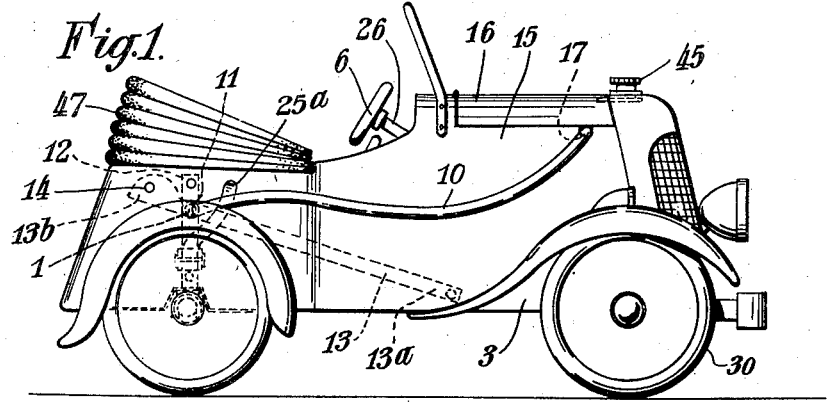
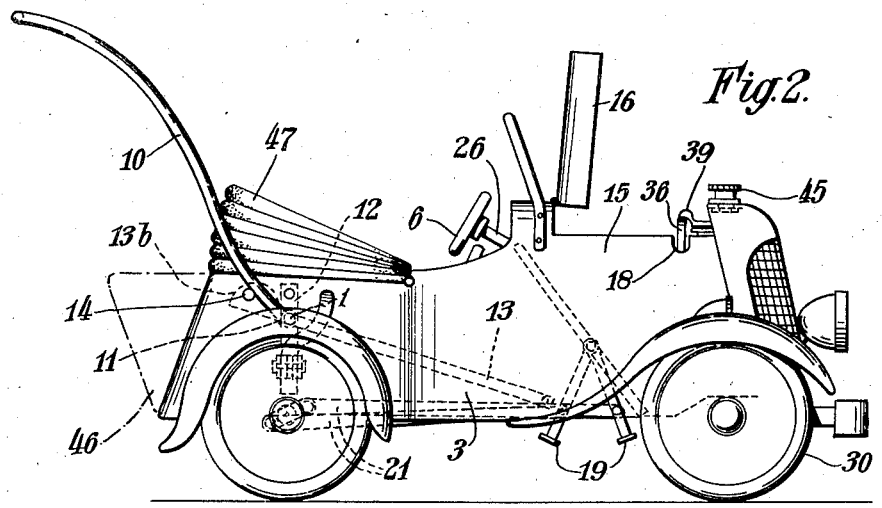
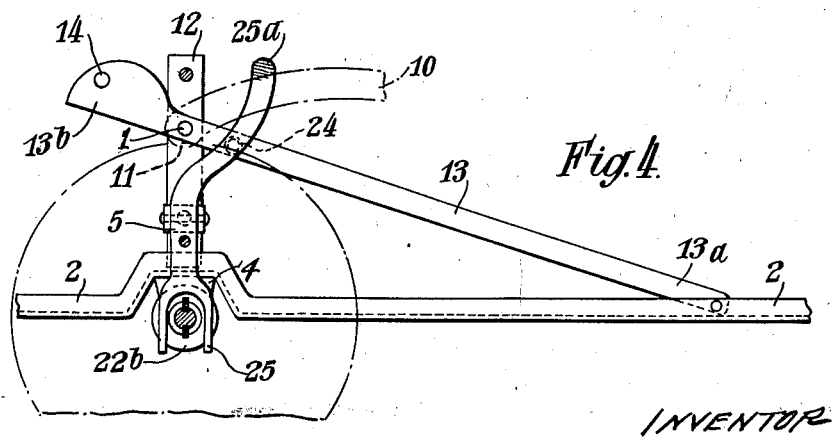
INVENTOR
E. T. HOLDER
ATTYS

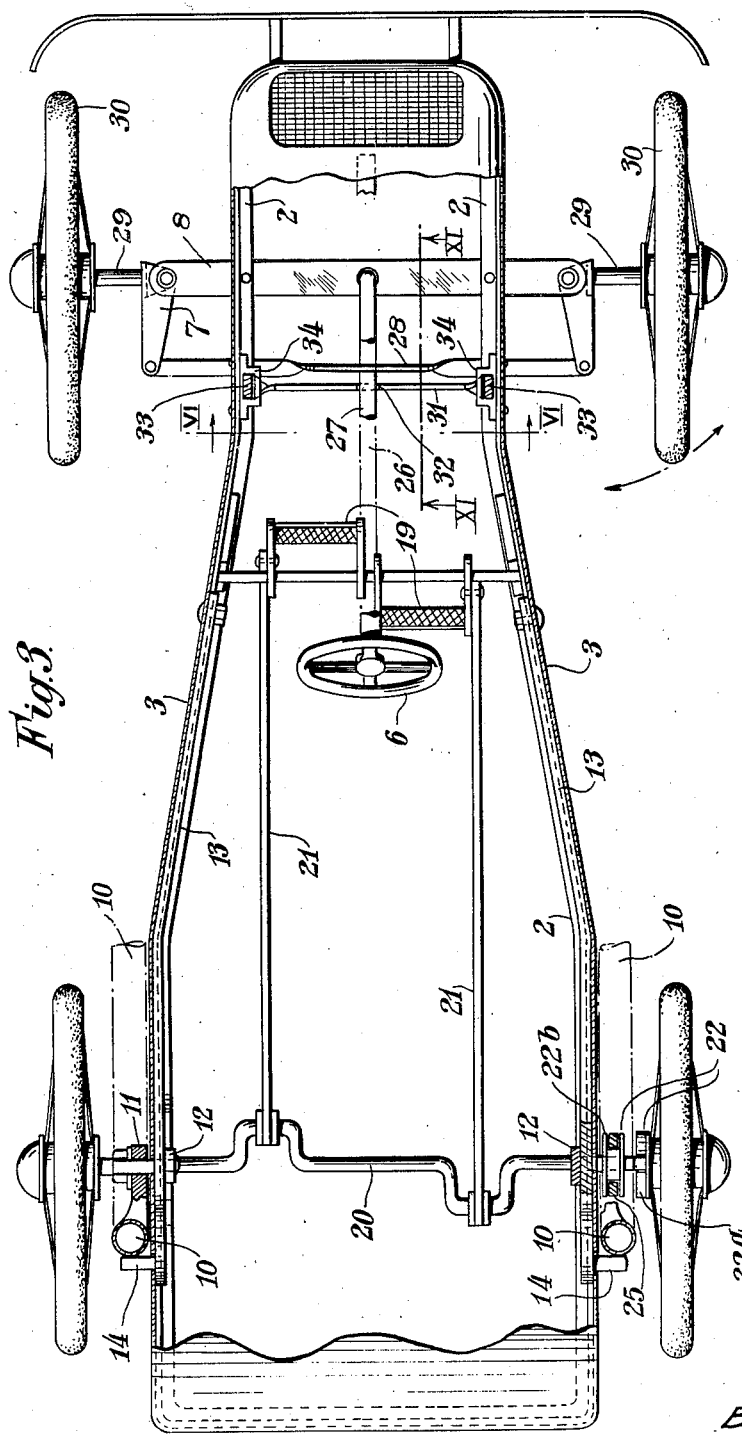

June 11, 1946. E. T. HOLDER 2,402,046
VEHICLE FOR CHILDREN
Filed March 23, 1944 4 Sheets-Sheet 3
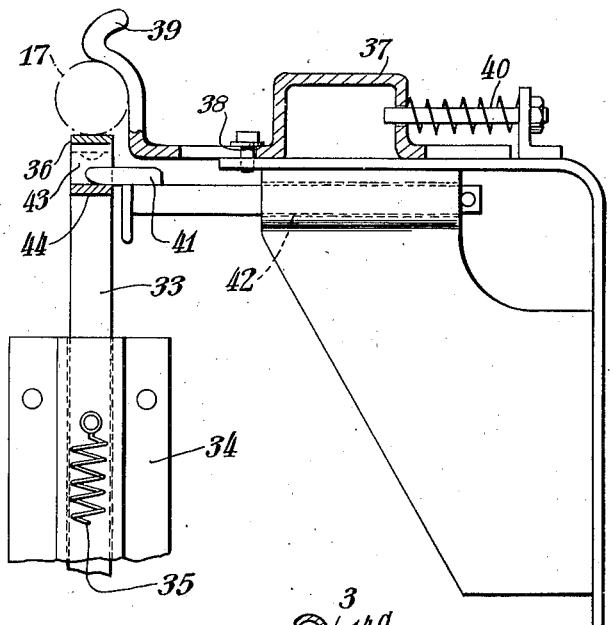
Fig.8.
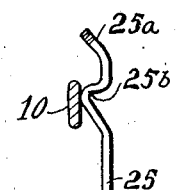
Fig.10.
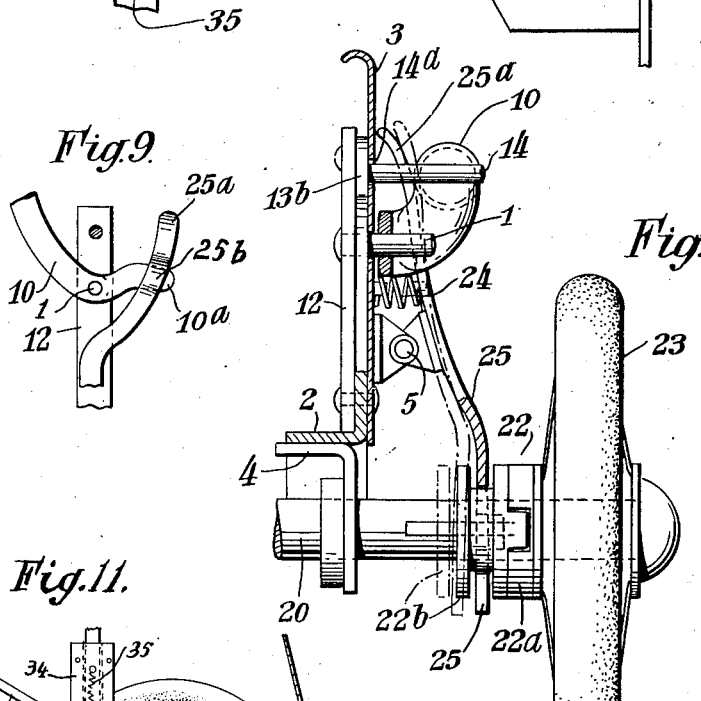
Fig.9.
Fig.5.
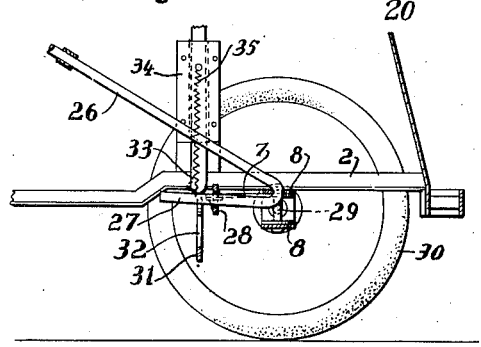
Fig.11.
INVENTOR
E.T. HOLDER
By
ATTYS June 11, 1946.  E. T. HOLDER  2,402,046
VEHICLE FOR CHILDREN
Filed March 23, 1944  4 Sheets-Sheet 4

INVENTOR
E. T. HOLDER

Patented June 11, 1946

2,402,046

UNITED STATES PATENT OFFICE 2,402,046

VEHICLE FOR CHILDREN

Edward Thomas Holder, Cheltenham, England

Application March 23, 1944, Serial No. 527,788
In Great Britain April 8, 1943

16 Claims. (Cl. 280—269)

This invention relates to vehicles for children.

The object of the invention is to provide a vehicle for children which can be propelled and steered under the control of a child occupant or can be rapidly and easily converted into a hand propelled vehicle without discomfort to the child occupant.

A further object of the invention is to provide means for rendering the steering controlled by a child occupant inoperative during external hand propulsion.

A further object of the invention is to provide a vehicle for children which can be propelled and controlled by a child occupant or alternatively by external hand propulsion in which tilting of the vehicle during hand propulsion can be effected without unduly stressing the body of the vehicle.

A further object of the invention is to provide a vehicle for children which can be readily adapted to simulate an automobile when the vehicle is being propelled by a child occupant.

These and other objects of the invention will be more readily understood after reading the following description of the accompanying drawings which illustrate a vehicle for children made according to the invention, and in which:

Figure 1 is a side elevation of a pedal-propelled vehicle simulating a motor car, showing the handle in the inoperative position;

Figure 2 is a similar view to Figure 1, showing the handle in the operative position;

Figure 3 is a plan, partly in section, showing the chassis and the general lay-out of the vehicle.

Figure 4 is a detail side elevation showing the arrangement of the clutch lever and a framework for transmitting tilting stresses forwardly of the vehicle;

Figure 5 is a rear detail view of the clutch mechanism showing in full lines the clutch parts in the engaged position and in dotted lines in the disengaged position;

Figure 8 illustrates a spring catch for retaining the handle in the inoperative position, Figures 9 and 10 are respectively elevation and end detail views showing a modified means for operating the clutch lever, and Figure 11 is a sectional elevation taken on line XI—XI, Fig. 3, looking in the direction of the arrows.

Figure 6:
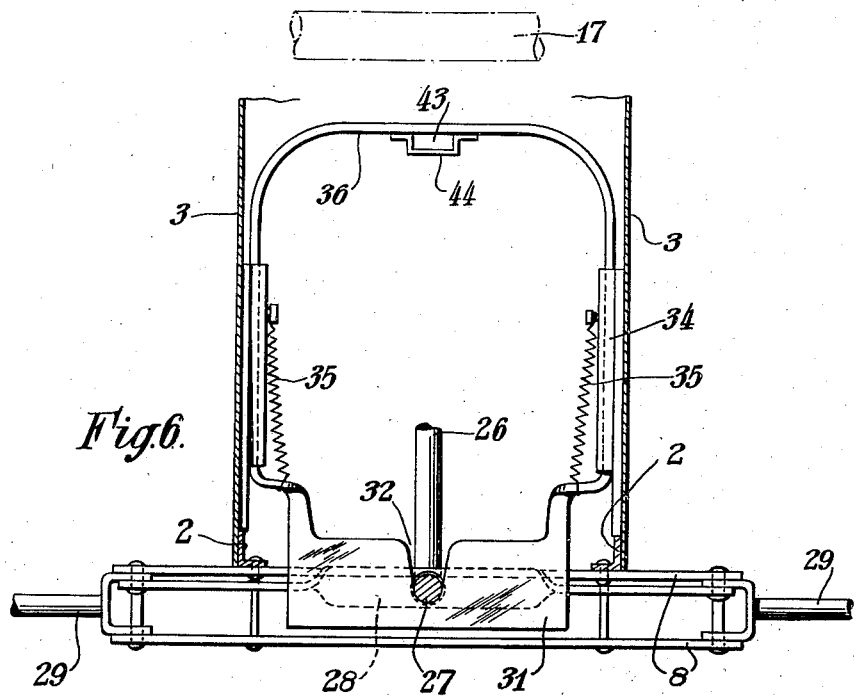
Figure 6 is a part section on the line VI—VI, Figure 3, showing the steering in the locked position.

In the drawings the handle 10 is composed of steel tubing of substantially U-shaped form, the ends 11 of the sides of the handle being pivotally mounted on a pivot pin 1 on each side of the vehicle on vertical bars 12, 12 (Figures 1 and 4). The lower ends of the bars 12 are riveted to an angle member 2 of the chassis and to the sheet metal body 3 of the vehicle as shown in Figure 5, the angle member 2 extending all around the vehicle and resting on angle members such as 4 (Figure 5) on the rear and front axles. Also pivotally mounted on these bars 12, 12, at each side of the vehicle and within the body is an angle lever 13, the longer arm 13a of which extends along the body and is secured at its front end to the angle member 2, the shorter arm 13b of each of the levers 13 being provided with a pin or projection 14 constituting a stop adapted to be engaged by the handle when the latter is in its operative position in which it projects at an angle to the horizontal beyond the rear of the body as shown in Figure 2. The pins 14 pass through a clearance hole 14a (Figure 5) in the body 3.

The bonnet 15 of the vehicle is provided with a hinged lid or cover 16 which when open permits the handle to be fully moved to its inoperative position shown in Figure 1, in which the cross-bar 17 of the handle 10 fits within slots 18 in the vertical side walls of the bonnet and when the cover is closed the visible portions of the handle simulate the exhaust pipes extending outside along the body of a racing car.

The pedal mechanism 19 (Fig. 3) is coupled to the rear axle 20 through connecting rods 21, the rear wheels being loosely mounted on this axle. A dog clutch 22 (Figure 5) is provided, one element 22a of which is rigidly connected to one of the rear wheels 23, the other element 22b of the clutch being arranged to be driven by the axle 20 and to be slidably mounted thereon so as to enable the clutch to be coupled and uncoupled. The clutch element 22b is arranged to be normally maintained in its uncoupled position by means of a control spring 24 and to be moved to its coupled position by means of a forked lever 25, pivotally mounted at 5 on one of the bars 12, the forked arms of the lever engaging with the clutch element 22b while the other arm 25a of the lever is adapted to be engaged by the handle 10 of the vehicle in its inoperative position so as to move the clutch element into its coupled position and to maintain it in this position against the action of the control spring 24.

The steering column 26 of the vehicle is shaped as usual at its lower end to form an arm 27 (see Fig. 11) adapted to move a transverse bar 28 in one direction or the other as the steering wheel 6 is rotated from its mean or central position, this bar acting through levers 7, 7 (Figure 3) pivotally mounted at each end of a frame 8 to displace correspondingly stub axles 29 on which latter the front wheels 30 are mounted.

In order to center and to lock the steering control when the vehicle is not being driven by the occupant a transverse plate 31 is provided below the arm 27 on the steering column 26, this plate 31 being provided with a substantially V-shaped slot 32 in its upper edge so that when the plate 31 is raised from its normal or inoperative position the arm 27 on the steering column enters the slot 32 and is thereby centered and locked in its central position, in which the steering wheels are aligned with the rear wheels or the planes of these front wheels are parallel to the longitudinal axis of the vehicle.

Figure 7:
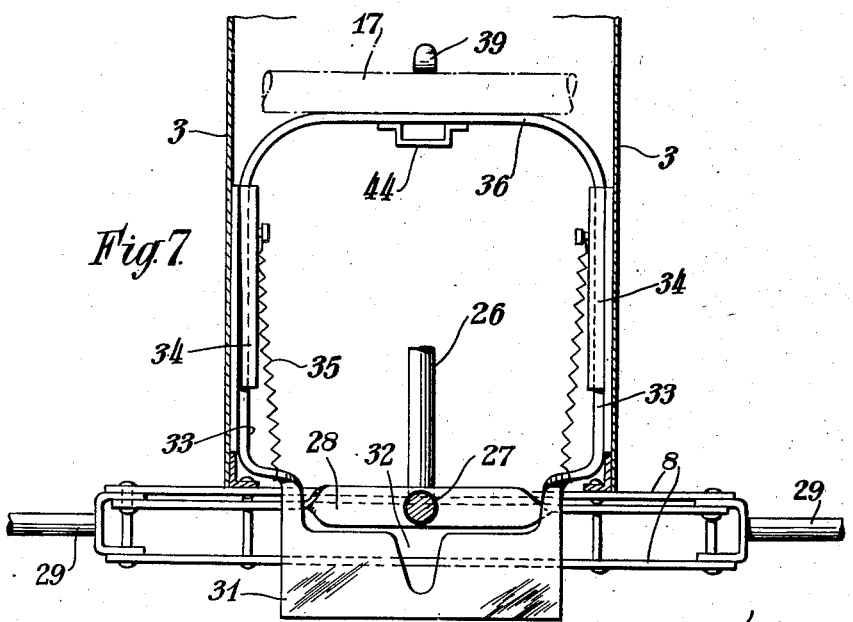
Figure 7 is a similar view to Figure 6 showing the steering in the unlocked position.

The transverse plate 31 is provided at each end with supporting arms 33 (Figures 6 and 7) which are mounted for vertical sliding movement in guides 34 and are normally retained in the raised position (Figure 6) by springs 35 attached between the arms 33 and the guides 34. The arms 33 are connected at the top by a crossbar 36, which is so positioned that when the handle 10 is rotated into its inoperative position it engages the crossbar 36 through the arms 33 and presses the plate 31 downwards out of engagement with the arm 27 of the steering column as shown in Figure 7.

In order to retain the handle 10 in its inoperative position against the action of the springs 35 the spring catch shown in Figure 8 is provided inside the front of the vehicle. This catch comprises a locking strip 37 slidably mounted on a stud 38 and having its outer end 39 shaped as shown to engage and hold the front bar 17 of the handle 10 in its inoperative position. The strip 37 is also slidably mounted on a spring-pressed bolt 40. The arrangement is such that the handle can be pressed down past the end 39, sliding the strip 37 over the bolt 40 against the spring pressure, and when the handle is past the shaped end 39 the latter snaps back under the action of the spring 40 to engage the handle.

It may be desired to allow the child passenger to continue steering the vehicle when the vehicle is being wheeled by the handle 10. In order to permit this an additional catch comprising a second bolt 41 slidably mounted in a slot 42 may be arranged to be slidden into an aperture 43 formed below the crossbar 36 by a shaped strip 44 in order to hold down the plate 31 when the handle is in the operating position.

In a modification of the clutch operating mechanism shown in Figures 9 and 10 the spring 24 is eliminated and the clutch lever is positively operated in both directions by the movement of the handle 10. As shown in these two figures one end of the handle 10 has an extension 10a adapted to engage an abutment 25b on the opposite side of the part 25a of the clutch lever 25 to that engaged by the handle 10. According to this modification the part 25a is engaged by handle 10 when the latter is in the inoperative position and the clutch is engaged when the handle is moved into the inoperative position in the same manner as above described, but when the handle is moved into the operative position the extension 10a bears against the abutment 25b and disengages the clutch.

Further, the radiator cap 45 may be utilised to secure the hinged lid 16 in the closed position, and a "boot" 46 of ample capacity may be provided, as indicated in dot and dash lines in Figure 2, for parcels and the like. A collapsible hood 47 is fitted at the rear of the vehicle.

In the arrangement described the clutch is automatically connected to and disconnected from the rear axle, and the steering mechanism locked and unlocked, if desired, by corresponding movement of the handle into either of its two positions. Also, when the handle is used for propulsion, any tilting movement is transmitted by the bars or the like 13 directly to the chassis member 2, forwardly of the vehicle, thereby preventing the bodywork from being stressed and possibly damaged.

What I claim and desire to secure by Letters Patent is:

1. In a vehicle for children, front and rear axles, wheels mounted on said axles, means for driving the rear axle, a steering mechanism arranged to be operatively connected to the front wheels, a clutch for connecting the drive to the rear axle, a handle for manual propulsion adapted to be moved into either one of two positions, in one of which it is extended and can be used for manual propulsion and in the other of which it is folded down around the vehicle, and means operable when the handle is moved into the extended position to disengage the clutch to disconnect the drive to the rear axle, said means also being operable when the handle is moved into the folded position to engage the clutch to connect the drive to the rear axle.

2. In a vehicle for children, front and rear axles, wheels mounted on said axles, steering mechanism arranged to be operatively connected to the front wheels, a handle for manual propulsion adapted to be moved into either one of two positions, in one of which it is extended and can be used for manual propulsion and in the other of which it is folded down around the vehicle, and a locking device adapted to lock the steering mechanism in a central inoperative position when the handle is in the extended position, said locking device being inoperative when the handle is in the folded position.

3. In a vehicle for children front and rear axles, wheels mounted on said axles, means for driving the rear axle, a handle for manual propulsion adapted to be moved into either one of two positions, in one of which it is extended and can be used for manual propulsion and in the other of which it is folded down around the vehicle, a clutch for connecting the drive to the rear axle, means operable when the handle is moved into the extended position to disengage the clutch to disconnect the drive to the rear axle, said means also being operable when the handle is moved into the folded position to engage the clutch to connect the drive to the rear axle, a steering mechanism arranged to be operatively connected to the front wheels, and a locking device adapted to lock the steering mechanism in a central and inoperative position when the handle is in the extended position, said locking device being inoperative when the handle is in the folded position.

4. A vehicle according to claim 3 wherein the clutch engaging and disengaging means comprise a clutch lever, a spring acting on said clutch lever and tending to maintain the clutch disengaged, the handle being adapted when moved into the folded position to actuate said clutch lever against the spring pressure to engage said clutch, and to hold it in the engaged position.

5. A vehicle according to claim 3 wherein the clutch engaging and disengaging means comprise a clutch lever adapted to be actuated by said handle when the latter is moved into the folded position to actuate said clutch lever to engage said clutch, and when the handle is moved into the extended position to disengage said clutch.

6. A vehicle according to claim 3 wherein said locking device for the steering mechanism comprises a spring-pressed plate having a recess tending to engage a part of the steering column to lock the latter and means actuated when the handle is moved into the folded position for moving said plate against its spring out of engagement with the steering column.

7. A vehicle according to claim 3 wherein said locking device for the steering mechanism comprises a spring-pressed plate having a recess tending to engage a part of the steering column to lock the latter and means actuated when the handle is moved into the folded position for moving said plate against its spring out of engagement with the steering column, and further comprising a spring catch adapted to hold the handle in the folded position against the spring-pressure of said plate.

8. A vehicle according to claim 3 wherein said locking device for the steering mechanism comprises a spring-pressed plate having a recess tending to engage a part of the steering column to lock the latter and means actuated when the handle is moved into the folded position for moving said plate against its spring out of engagement with the steering column, and further comprising a spring catch adapted to hold the handle in the folded position against the spring pressure of said plate, and means for holding the locking device inoperative, if desired, when the handle is moved into the extended position.

9. In a vehicle for children, front and rear axles, wheels mounted on said axles, pedal means for driving the rear axle, a steering mechanism arranged to be operatively connected to the front wheels, a clutch for connecting the drive to the rear axle, a handle for manual propulsion adapted to be moved into either one of two positions, in one of which it is extended and can be used for manual propulsion, and in the other of which it is folded down around the vehicle, and means operable when the handle is moved into the extended position to disengage the clutch to disconnect the drive to the rear axle, said means also being operable when the handle is moved into the folded position to engage the clutch to connect the drive to the rear axle.

10. In a vehicle for children, front and rear axles, wheels mounted on said axles, pedal means for driving the rear axle, steering mechanism arranged to be operatively connected to the front wheels, a handle for manual propulsion adapted to be moved into either one of two positions, in one of which it is extended and can be used for manual propulsion and in the other of which it is folded down around the vehicle and a locking device adapted to lock the steering mechanism in a central inoperative position when the handle is in the extended position, said locking device being inoperative when the handle is in the folded position.

11. In a vehicle for children, front and rear axles, wheels mounted on said axles, means under the control of a child occupant for driving the rear axle, a steering mechanism arranged to be operatively connected to the front wheels, a handle for external manual propulsion mounted for rocking into either one of two positions, in one of which it extends beyond the vehicle for the purpose of manual propulsion and in the other of which it extends along both sides of the vehicle and simulates the exhaust pipes of an automobile, and a locking device adapted to lock the steering mechanism in a central inoperative position when the handle is in the extended position, said locking device being inoperative when the handle is in the folded position.

12. In a vehicle for children, front and rear axles, wheels mounted on said axles, means under the control of a child occupant for driving the rear axle, clutch means for connecting the drive to, and disengaging it from, the rear axle, a steering mechanism arranged to be operatively connected to the front wheels, a handle for external manual propulsion mounted for rocking into either one of two positions, in one of which it extends beyond the vehicle for the purpose of manual propulsion and in the other of which it extends along both sides of the vehicle and simulates the exhaust pipes of an automobile, a locking device adapted to lock the steering mechanism in a central inoperative position when the handle is in the extended position, said locking device being inoperative when the handle is in the folded position, and means operable when the handle is moved into the extended position to disengage the clutch to disconnect the drive to the rear axle, said means also being operable when the handle is moved into the folded position to engage the clutch to connect the drive to the rear axle.

13. In a vehicle for children simulating in miniature a motor-car having a bonnet, a U-shaped handle pivotally mounted at its open ends at one end of the vehicle so that it can be swung or moved from a position in which it is available as a handle to a position around the vehicle in which it will appear to form part of the structure of the vehicle, and means, when the handle is in the latter position, for concealing the closed end of the handle in the bonnet of the vehicle, whereby the side members of the handle extend along the sides of the vehicle to simulate exhaust pipes.

14. In a vehicle for children simulating in miniature a motor-car, a U-shaped handle pivotally mounted at its open ends at one end of the vehicle so that it can be swung or moved from a position in which it is available as a handle to a position around the vehicle in which it will appear to form part of the structure of the vehicle, a bonnet hingeably mounted on a transverse axis, recesses being provided between the lower edges of the bonnet and the upper edges of the sides of the vehicle below the bonnet to receive the closed end of the handle when the latter is moved into the last named position, whereby the bonnet can be closed down to conceal the closed end of the handle, the side members of which then extend along the sides of the vehicle to simulate exhaust pipes.

15. In a vehicle for children, front and rear axles, wheels mounted on said axles, steering mechanism arranged to be operatively connected to the front wheels, a handle for manual propulsion adapted to be moved into either one of two positions, in one of which it is extended and can be used for manual propulsion and in the other of which it is folded down around the vehicle, a locking device adapted to lock the steering mechanism in a central inoperative position when the handle is in the extended position, said locking device being inoperative when the handle is in the folded position, and means for preventing the actuation of said locking device when it is desired to allow the child occupant to steer the vehicle when the handle is in the extended position and the vehicle is being manually propelled.

16. In a vehicle for children, front and rear axles, wheels mounted on said axles, pedal means for driving the rear axle, steering mechanism arranged to be operatively connected to the front wheels, a handle for manual propulsion adapted to be moved into either one of two positions, in one of which it is extended and can be used for manual propulsion and in the other of which it is folded down around the vehicle, a locking device adapted to lock the steering mechanism in a central inoperative position when the handle is in the extended position, said locking device being inoperative when the handle is in the folded position, and means for preventing the actuation of said locking device when it is desired to allow the occupant to steer the vehicle when the handle is in the extended position and the vehicle is being manually propelled.

EDWARD THOMAS HOLDER.